(12) United States Patent
Thiel

(10) Patent No.: US 9,577,570 B2
(45) Date of Patent: Feb. 21, 2017

(54) DRIVE SYSTEM FOR A VEHICLE TRAILER MANEUVERING DRIVE

(71) Applicant: Truma Geraetetechnik GmbH & Co. KG, Putzbrunn (DE)

(72) Inventor: Stefan Thiel, Rosenheim (DE)

(73) Assignee: Truma Geraetetechnik GmbH & Co. KG, Putzbrunn (DE)

( * ) Notice: Subject to any disclaimer, the term of this patent is extended or adjusted under 35 U.S.C. 154(b) by 0 days.

(21) Appl. No.: 14/448,519

(22) Filed: Jul. 31, 2014

(65) Prior Publication Data

US 2015/0035456 A1     Feb. 5, 2015

(30) Foreign Application Priority Data

Aug. 1, 2013   (DE) .................. 10 2013 108 258

(51) Int. Cl.
| | |
|---|---|
| B60L 11/18 | (2006.01) |
| H02K 7/10 | (2006.01) |
| H02P 31/00 | (2006.01) |
| B60L 15/08 | (2006.01) |
| B60L 15/20 | (2006.01) |
| B62D 59/04 | (2006.01) |
| H02P 7/00 | (2016.01) |

(52) U.S. Cl.
CPC ............ *H02P 31/00* (2013.01); *B60L 11/1803* (2013.01); *B60L 15/08* (2013.01); *B60L 15/2009* (2013.01); *B60L 15/2054* (2013.01); *B60L 15/2063* (2013.01); *B60L 2200/28* (2013.01); *B60L 2200/46* (2013.01); *B60L 2240/30* (2013.01); *B60L 2240/421* (2013.01); *B60L 2240/486* (2013.01); *B60W 2300/14* (2013.01); *B62D 59/04* (2013.01); *H02P 7/00* (2013.01); *Y02T 10/645* (2013.01); *Y02T 10/7005* (2013.01); *Y02T 10/72* (2013.01); *Y02T 10/7275* (2013.01)

(58) Field of Classification Search
CPC ....................................................... H02P 31/00
USPC ................................................... 318/12, 541
See application file for complete search history.

(56) References Cited

U.S. PATENT DOCUMENTS

| | | | | |
|---|---|---|---|---|
| 5,602,448 | A * | 2/1997 | Yaguchi .................. | 318/139 |
| 6,249,100 | B1 * | 6/2001 | Lange ..................... | 318/471 |
| 6,808,043 | B2 * | 10/2004 | Kawada et al. .......... | 180/446 |
| 6,837,331 | B2 * | 1/2005 | Kawada et al. .......... | 180/446 |

(Continued)

FOREIGN PATENT DOCUMENTS

| | | |
|---|---|---|
| DE | 202009005524 | 7/2009 |
| EP | 0895346 | 2/1999 |

(Continued)

OTHER PUBLICATIONS

Search Report for European Patent Application No. 14177310.1 (mailed Sep. 29, 2015).

(Continued)

*Primary Examiner* — Erick Glass
(74) *Attorney, Agent, or Firm* — Klarquist Sparkman, LLP

(57) ABSTRACT

Disclosed are drive systems for a vehicle trailer maneuvering drives, some embodiments having a motor unit and a voltage source for supplying the motor unit, wherein the motor unit comprises a brushed electric motor with motor shaft and a motor controller that may include a speed detection unit for detecting the speed of the motor shaft and a control and regulating unit for the motor, for its voltage supply.

13 Claims, 2 Drawing Sheets

(56) References Cited

U.S. PATENT DOCUMENTS

| | | | |
|---|---|---|---|
| 2003/0155172 A1* | 8/2003 | Kawada et al. | 180/446 |
| 2006/0144172 A1* | 7/2006 | Sasaki | 73/866.1 |
| 2008/0029997 A1 | 2/2008 | Wickelmaier et al. | |
| 2012/0215413 A1* | 8/2012 | Kluka | B60W 50/00 701/70 |
| 2012/0323430 A1* | 12/2012 | Nakamura | B60L 11/1803 701/22 |

FOREIGN PATENT DOCUMENTS

| | | |
|---|---|---|
| EP | 1 203 713 A2 | 5/2002 |
| EP | 1225090 | 7/2002 |
| EP | 1790555 | 5/2007 |
| EP | 2138387 | 12/2009 |

OTHER PUBLICATIONS

Office Action from Canadian Intellectual Property Office for Canadian Patent Application No. 2,855,663, mailed Nov. 9, 2015.

\* cited by examiner

DRIVE SYSTEM FOR A VEHICLE TRAILER MANEUVERING DRIVE

CROSS REFERENCE TO RELATED APPLICATION

The present application claims priority from pending German Patent Application No. 10 2013 108 258.0, filed Aug. 1, 2013, which is incorporated herein by reference.

The invention relates to a drive system for a vehicle trailer maneuvering drive, with at least one motor unit and a voltage source for supplying the motor unit.

Maneuvering or auxiliary drives which provide for shifting or turning a trailer with motor support also without towing vehicle are known from the prior art. They include drive systems which drive a drive roller which cooperates with a wheel of the trailer, in order to move the trailer. The drive systems known from the prior art generally can be divided into two categories of drive systems for a vehicle trailer maneuvering drive, wherein the categories differ in the motor unit. The first category includes brushed motors, whereas the second category comprises brushless motors. The second category with the brushless motors is characterized in that in contrast to the drive systems with brushed motors they have a finer handling, which allows to particularly finely maneuver the vehicle trailers with very slow movements. This better handling however results in increased costs due to the brushless motor and due to a more expensive electronic system.

Therefore, it is the object of the invention to create a drive system for a vehicle trailer maneuvering drive which has the better handling of a drive system with brushless motor and yet can be realized easily and at low cost.

According to the invention, this object is solved by a drive system for a vehicle trailer maneuvering drive, with at least one motor unit and a voltage source for supplying the motor unit, wherein the motor unit comprises a brushed electric motor with motor shaft and a motor controller which includes a speed detection unit for detecting the speed of the motor shaft and a control and regulating unit for the motor, in particular for its voltage supply. The basic idea of the invention is to develop a drive system with brushed electric motor such that in case of need it has the same fine, very slow handling as it is known from drive systems with brushless motors. For this purpose, the speed of the motor shaft is detected by the speed detection unit and transmitted to the motor controller, wherein the motor controller regulates the voltage consumption of the motor via the control and regulating unit such that a very small speed value of the motor can be achieved. For this purpose, the control and regulating unit in particular varies the voltage supply of the brushed electric motor.

According to one aspect of the invention it is provided that the motor controller comprises a PWM generator, so that the voltage output by the voltage source is controlled via a PWM signal. Via the pulse width modulation, the speed of the motor can be controlled or regulated correspondingly low, since the voltage at the motor corresponds to the product of operating voltage and duty cycle. By means of the PWM signal, the motor can be actuated correspondingly softly, wherein this is frequency-dependent.

In particular, it is provided that when operating the drive system on level ground, not more than 90%, in particular not more than 80% of the maximum PWM is used. It thereby is achieved that a reserve is present, whereby even with an uphill gradient the speed of the motor can be kept constant.

According to a further aspect of the invention it is provided that the motor controller is provided at the motor shaft. The speed thereby is detected and controlled directly at the motor shaft. The consequence is that short electric lines can be used, whereby the high switching currents which occur on actuation of the motor do not lead to problems with regard to the electromagnetic compatibility (EMC).

According to a further aspect of the invention it is provided that the motor controller comprises a circuit which includes at least one switch formed as transistor, in particular a MOSFET or a PROFET. Via the transistor provided in the circuit the voltage or current intensity control of the motor can be effected, wherein the transistor is actuated with the PWM signal generated by the PWM generator or couples the signals in, in order to correspondingly control or regulate the voltage supply of the motor.

In particular, the circuit additionally comprises at least one relay switch, wherein the relay switch can control or regulate the current direction through the motor. By means of the relay switch it is possible that the motor of the drive system can rotate both in forward and in backward direction, which has a corresponding effect on the drive roller of the vehicle trailer maneuvering drive. A further advantage of the formation of the circuit with a mechanical switch, such as the relay switch, and a semiconductor switch, such as the transistor, consists in the fact that the failure safety is increased via the two different technologies.

According to a further aspect of the invention it is provided that the speed detection unit is an encoder which is arranged directly on the motor shaft. In this way, longer lines are prevented, since the encoder is arranged directly on the motor shaft. The encoder can detect the speed of the motor shaft optically, magnetically or mechanically and convert it into an electrical signal which is evaluated correspondingly by the motor controller.

A further aspect of the invention provides a safety element, in particular a switch which is arranged in the voltage-carrying line between the voltage source and the motor unit. The safety of the drive system thereby is increased, since the voltage supply to the motor can be interrupted in a corresponding case of emergency.

In particular, there is provided a central unit which is connected with the motor unit, in particular with the motor controller. Via the central unit, the motor controller can be connected with further control systems and communicate with the same.

According to a further aspect of the invention, the central unit can clear the motor unit, in particular via a PWM signal. This enabling signal can be formed as so-called killswitch signal, whereby the central unit switches the complete motor unit on and off.

In particular, the central unit is connected with the motor controller via a LIN data bus. The LIN data bus represents a cross-linkage of the central unit with the motor controller, whereby commands of the central unit can be transmitted to the motor controller. Furthermore, data can also be sent from the motor controller via the LIN data bus to the central unit, for example the actual speed, power consumption, voltage etc., which can be used for further control systems. The LIN data bus represents a particularly inexpensive communication.

According to a further aspect of the invention a transmission is provided, in particular a self-locking transmission or a gearwheel transmission with additional holding brake. Via the transmission, the torque produced by the motor can be stepped up, whereby a different torque is obtained at a drive roller of the vehicle trailer maneuvering drive as compared to the motor torque.

A further aspect of the invention provides that the motor controller includes a microcontroller. The microcontroller can be formed such that it comprises the PWM generator, a data processing unit which processes the data of the LIN data bus, and an evaluation unit which receives the data of the speed detection unit and sends the same to the central unit as well as decodes and forwards the commands of the central unit. The microcontroller thus represents the central element of the motor controller.

According to a further aspect of the invention, the drive system comprises a swivel actuator for swiveling a drive roller against a wheel to be driven. Swiveling of the drive roller thus is also effected electrically and not mechanically. The swivel actuator can also be connected with the microcontroller or directly with the central unit.

Further advantages and aspects of the invention can be taken from the following description and the drawings to which reference is made.

Figures 1, 2:
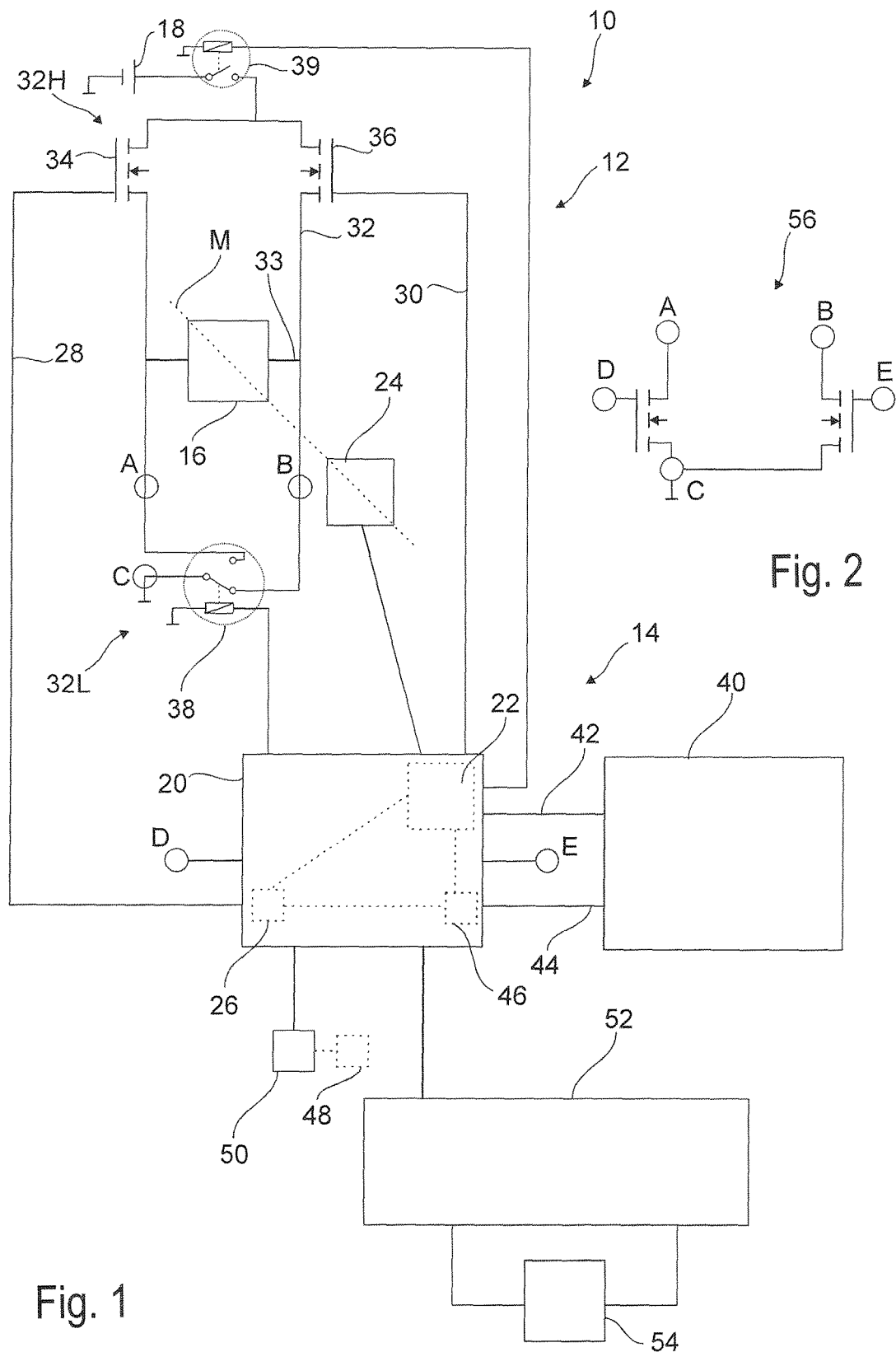
FIG. 1 shows a schematic arrangement of the drive system according to the invention.
FIG. 2 shows a substitute circuit for the relay change-over switch.

FIG. 1 schematically shows a drive system 10 which among other things comprises a motor unit 12. The motor unit 12 includes a motor controller 14 as well as a motor 16 with motor shaft M. The motor 16 is a brushed electric motor which is supplied by a voltage source 18 which likewise is part of the drive system 10.

The motor controller 14 includes a microcontroller 20 as central part, which among other things comprises a control and regulating unit 22. The motor controller 14 furthermore includes a speed detection unit 24 which is formed as encoder and is arranged directly on the motor shaft M (shown in broken lines). Via the speed detection unit 24 the speed of the motor shaft M is detected, wherein this typically is accomplished optically, magnetically or mechanically. The correspondingly detected data are forwarded from the speed detection unit 24 to the microcontroller 20 or the control and regulating unit 22.

Via the control and regulating unit 22 as well as a PWM generator 26, the motor controller 14 controls and regulates the voltage supply of the motor 16 by the voltage source 18. For this purpose, the control and regulating unit 22 is connected with the PWM generator 26. The PWM signals generated by the PWM generator 26, and in particular the duty cycle, can be controlled and regulated correspondingly by the control and regulating unit 22. The control and regulation is effected in dependence on the speed of the motor shaft M detected by the speed detection unit 24 and in dependence on the desired drive behavior of the drive system 10.

The PWM signals generated by the PWM generator 26 run over connecting lines 28, 30 to a circuit 32 which is formed similar to a bridge circuit. The circuit 32 connects the motor 16, which is arranged in a bridge arm 33, with the voltage source 18 and the motor controller 14 as such.

In the illustrated embodiment, the circuit 32 is formed of two transistor switches 34, 36 on the HighSide 32H and one relay switch 38 on the LowSide 32L, wherein the relay switch 38 is a relay change-over switch.

The two transistor switches 34, 36 can be formed as MOSFETs or PROFETs, wherein they convert or couple in the PWM signals generated by the PWM generator 26 such that the voltage supply of the motor 16 is controlled correspondingly to the duty cycle, so that its speed is controlled or regulated via the PWM signals.

It thereby is possible that the motor 16 is operated slowly and finely, so that the entire drive behavior of the drive system 10 or the handling of the vehicle trailer maneuvering drive is correspondingly fine and corresponds to that of a brushless motor.

The PWM signals provided for this purpose can be medium-frequency PWM signals.

The mechanical relay switch 38 arranged in the circuit 32 serves to reverse the current direction within the circuit 32, so that the electric motor 16 is operable in both directions. It thereby is possible that the drive system 10 can drive a drive roller 58 (FIG. 3) in both directions, so that the trailer or a trailer wheel 60 (FIG. 3) driven by the drive roller can be maneuvered both forwards and backwards.

Due to the formation of the circuit 32 with silicon switches, such as the transistors 34, 36, and with a mechanical switch, such as the relay switch 38, the operational safety of the circuit 32 and thus of the entire motor controller 14 is increased due to the employed different technologies. Jamming of the mechanical relay switch 38 can be prevented by switching off the transistors 34, 36, and blowing of the transistors 34, 36 can be prevented by opening of the relay switch 38.

In the circuit 32, a further safety element 39 in addition is arranged between the motor 16 and the voltage source 18, which is formed as switch and in case of need can completely separate the motor 16 from the voltage source 18.

The safety element 39 also can be formed as MOSFET or PROFET.

In addition, undesired running of the motor 16 already can be detected by the speed detection unit 24. This information can then be sent to the motor controller 14 or the control and regulating unit 22, so that the motor unit 12 is switched off.

The drive system 10 furthermore comprises a central unit 40 which is connected with the motor unit 12, in particular the microcontroller 20. The central unit 40 can clear the entire motor unit 12 via an enabling line 42. The enabling signal can be a so-called killswitch signal, which likewise is formed as PWM signal.

The central unit 40 in addition is connected with the microcontroller 20 via a LIN data bus 44, so that the central unit 40 can supply the microcontroller 20 and thus the motor controller 14 with data. For this purpose, the microcontroller 20 or the motor controller 14 includes a data processing unit 46 which receives and correspondingly processes the data sent by the central unit 40 via the LIN data bus 44.

The microcontroller 20 in addition can be formed such that via the data processing unit 46 it also sends data to the central unit 40, which can be utilized for other control systems. These data for example can be the actual speed of the motor shaft M, the power consumption of the motor 16, the current motor voltage or similar parameters of the drive system 10. For this purpose, among other things, the microcontroller 20 is connected with the corresponding data acquisition devices such as the speed detection unit 24.

Furthermore, the drive system 10 can include a transmission 48 by which the torque generated by the motor 16 is converted, so that a stepped-up torque is transmitted from the drive system 10 to the drive roller 58. For this purpose, the transmission 48 is arranged between motor 16 and drive roller 58.

The transmission 48 can be a self-locking transmission or a gearwheel transmission with an additional holding brake 50, which can brake the motor 16. The gearwheel transmission in particular can be formed as spur-gear transmission.

Alternatively, the motor 16 also can be braked by shorting the circuit 32.

Figure 3:
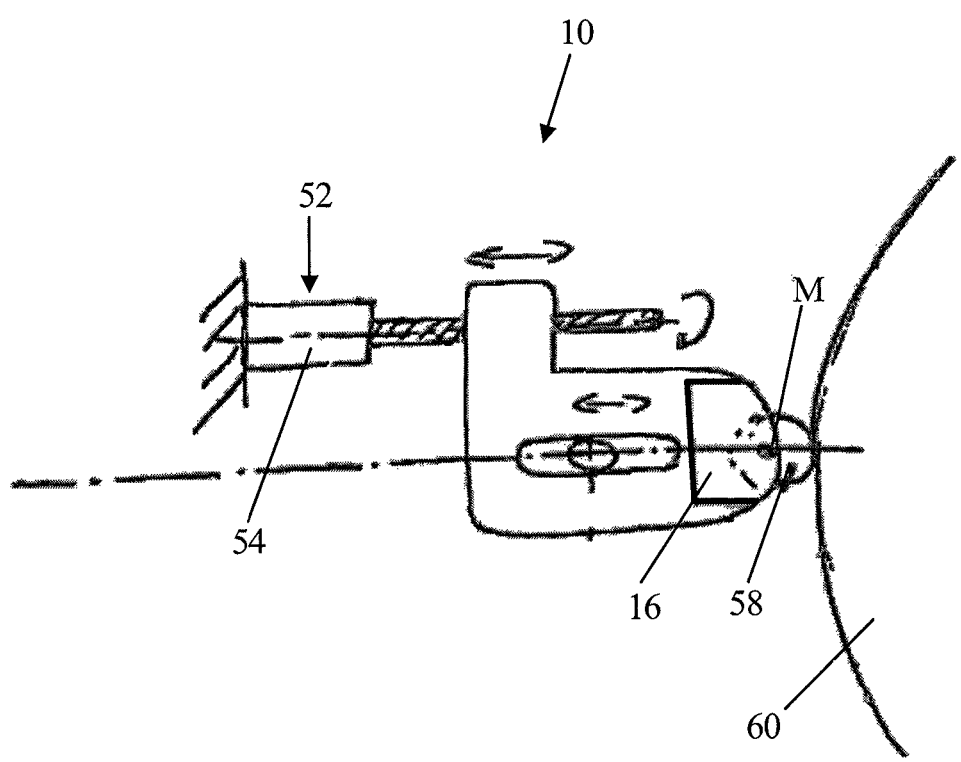
FIG. 3 shows a schematic arrangement of the drive system engaging a wheel of a vehicle trailer.

As shown schematically in FIG. 3, besides the motor controller 14 (FIG. 1), the drive system 10 also can comprise a swivel actuator 52 which is responsible for swiveling the drive roller 58 against the trailer wheel 60 to be driven. In the illustrated embodiment, the swivel actuator likewise is connected with the motor controller 14, so that the swivel actuator 52 receives signals from the microcontroller 20 and correspondingly drives a swivel motor 54.

Alternatively, the swivel actuator 52 also can directly be connected with the central unit 40.

The microcontroller 20 shown in the embodiment comprises the control and regulating unit 22, the PWM generator 26 and the data processing unit 46. Via the PWM generator 26, the microcontroller 20 thus generates the control and regulating signals for the circuit 32, which provide for such a soft speed control of a brushed electric motor 16. Furthermore, the microcontroller 20 decodes the signals which are sent by the central unit 40, and via the data processing unit 46 and the LIN data bus 44 sends and receives data for the central unit 40, which can be used for further systems.

The units realized in the microcontroller 20 also can be formed as separated units which are connected with each other.

The embodiment of the circuit 32 as shown in FIG. 1 only represents an exemplary configuration of the circuit 32.

The circuit 32 also can be a full bridge or H-circuit which on the HighSide 32H includes two transistors and on the LowSide 32L two relay switches, or a full bridge or H-circuit which on the LowSide 32L includes two transistors and on the HighSide 32H includes two transistors.

FIG. 2 shows a substitute circuit 56 which is connected with the substitution points A-E of FIG. 1, so that the circuit 32 with the substitute circuit 56 is a full bridge with a total of four transistors.

The two transistors from the substitute circuit 56 then are associated to the circuit 32 on the LowSide 32L and control the current direction through the motor 16. For this purpose, the transistors arranged in the substitute circuit 56 are actuated correspondingly by the motor controller 14.

The circuit 32 likewise can include only one transistor on the HighSide 32H, which is actuated correspondingly by the motor controller 14 via PWM signals, and a polarized relay switch on the LowSide 32L for changing the current direction and hence the direction of rotation of the motor 16.

The MOSFET transistors shown in the circuit 32 and the substitute circuit 56 are shown by way of example only. They can be both normally conducting and normally blocking and of the type n-channel or p-channel.

With the circuit 32 it actually is also possible to recover energy generated on braking, wherein the same can be fed into a non-illustrated recuperation means or directly into the voltage source 18, in order to charge the same.

In general, an inexpensive drive system for a vehicle trailer maneuvering drive is created with the drive system 10 according to the invention, which both has a fine handling and can be manufactured at low cost. In addition, the probability of failure is low due to the simple design of the electronic system.

The invention claimed is:

1. A drive system for a vehicle trailer maneuvering drive, comprising a first motor unit and a voltage source for supplying voltage to the first motor unit, wherein the first motor unit comprises a brushed electric motor with a motor shaft and a motor controller which includes a speed detection unit for detecting the speed of the motor shaft and a control and regulating unit for the first motor unit, in particular for its voltage supply, the motor shaft being coupled to a drive roller adapted for engaging a wheel of the vehicle trailer, further comprising a swivel actuator for swiveling the drive roller against the wheel of the vehicle trailer, the swivel actuator comprising a swivel motor.

2. The drive system according to claim 1, wherein the motor controller comprises a PWM generator, such that the voltage output by the voltage source is controlled via a PWM signal.

3. The drive system according to claim 2, wherein when operating the drive system on level ground, not more than 90%, in particular not more than 80% of the maximum PWM is used.

4. The drive system according to claim 1, wherein the speed detection unit of the motor controller is arranged on the motor shaft.

5. The drive system of claim 1, wherein the motor controller further comprises a circuit which includes at least one switch formed as transistor, in particular a MOSFET or a PROFET.

6. The drive system of claim 5, wherein the circuit additionally comprises at least one relay switch, wherein the relay switch can control or regulate the current direction through the motor.

7. The drive system of claim 1, wherein the speed detection unit is an encoder which is arranged directly on the motor shaft.

8. The drive system of claim 1, further comprising a safety element comprising a switch arranged in the voltage-carrying line between the voltage source and the motor unit.

9. The drive system of claim 1, further comprising a central unit which is connected with the motor controller of the motor unit.

10. The drive system of claim 9, wherein the central unit clears the motor unit via a PWM signal.

11. The drive system of claim 9, wherein the central unit is connected with the motor controller via a LIN data bus.

12. The drive system of claim 1, further comprising a self-locking transmission or a gearwheel transmission with an additional holding brake.

13. The drive system according of claim 1, wherein the motor controller includes a microcontroller.

* * * * *